United States Patent [19]

Kuzyk et al.

[11] Patent Number: 4,739,375
[45] Date of Patent: Apr. 19, 1988

[54] APPARATUS FOR PRODUCING INTERNEGATIVES AND SLIDES

[75] Inventors: Roman Kuzyk, Trenton, N.J.; Richard H. Bender, Gaithersburg, Md.; Lewis Edwards, Orlando, Fla.

[73] Assignee: ECB Technologies, Inc., Washington, D.C.

[21] Appl. No.: 17,119

[22] Filed: Feb. 20, 1987

Related U.S. Application Data

[63] Continuation-in-part of Ser. No. 903,478, Sep. 4, 1986, Pat. No. 4,690,546.

[51] Int. Cl.⁴ ............................................. G03B 27/72
[52] U.S. Cl. ...................................... 355/69; 355/68; 355/70
[58] Field of Search ............................. 355/68, 69, 70

[56] References Cited

U.S. PATENT DOCUMENTS

3,060,796 10/1962 Muse, Jr. .
3,308,716 3/1967 Caporael .
3,645,620 2/1972 Jaffe .
3,754,825 8/1973 Sorli et al. .
4,043,662 8/1977 Garfall .

FOREIGN PATENT DOCUMENTS

1460895 10/1966 France .

Primary Examiner—Monroe H. Hayes
Attorney, Agent, or Firm—Cushman, Darby & Cushman

[57] ABSTRACT

An apparatus for producing internegatives includes a slide holder for positioning the slide from which the internegative is to made, a primary photoflash unit for back-illuminating the slide and projecting the image thereof into a camera, a secondary photoflash unit for directing a contrast correction exposure into the camera via a reflecting plate, and a stored programmed controlled processor for controlling the time duration of the primary exposure, the contrast correction exposure, and the operation of the camera so as to properly exposure the film in the camera. A back-illuminated light screen is provided to allow the operator to evaluate the brightness of the slide so as to control the duration of the primary exposure and the contrast correction to consistently produce properly exposed internegatives. In a second embodiment, a single photoflash unit, in cooperating with a movably mounted neutral density filter, is used to effect both the primary and contrast correcting exposures.

29 Claims, 9 Drawing Sheets

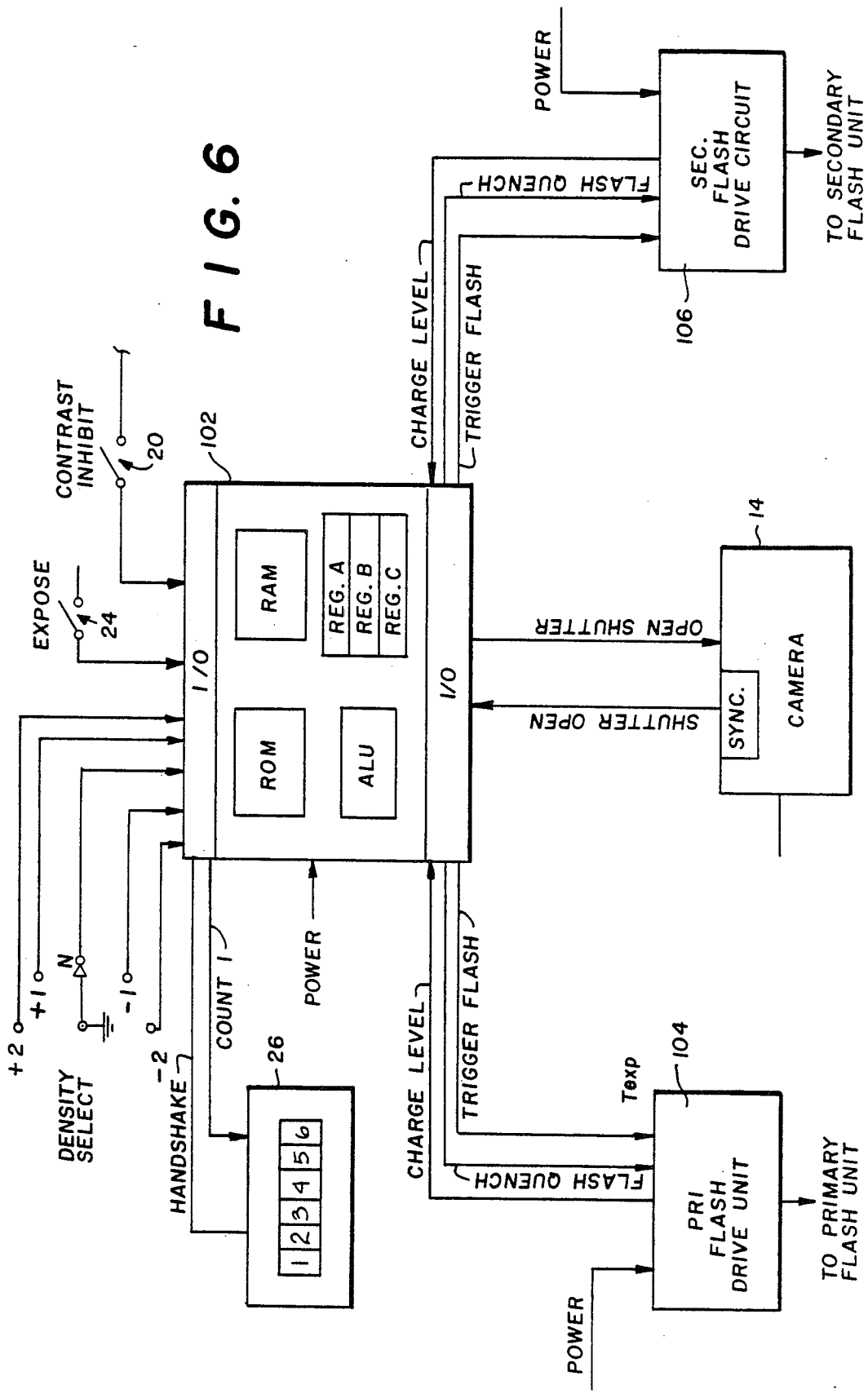

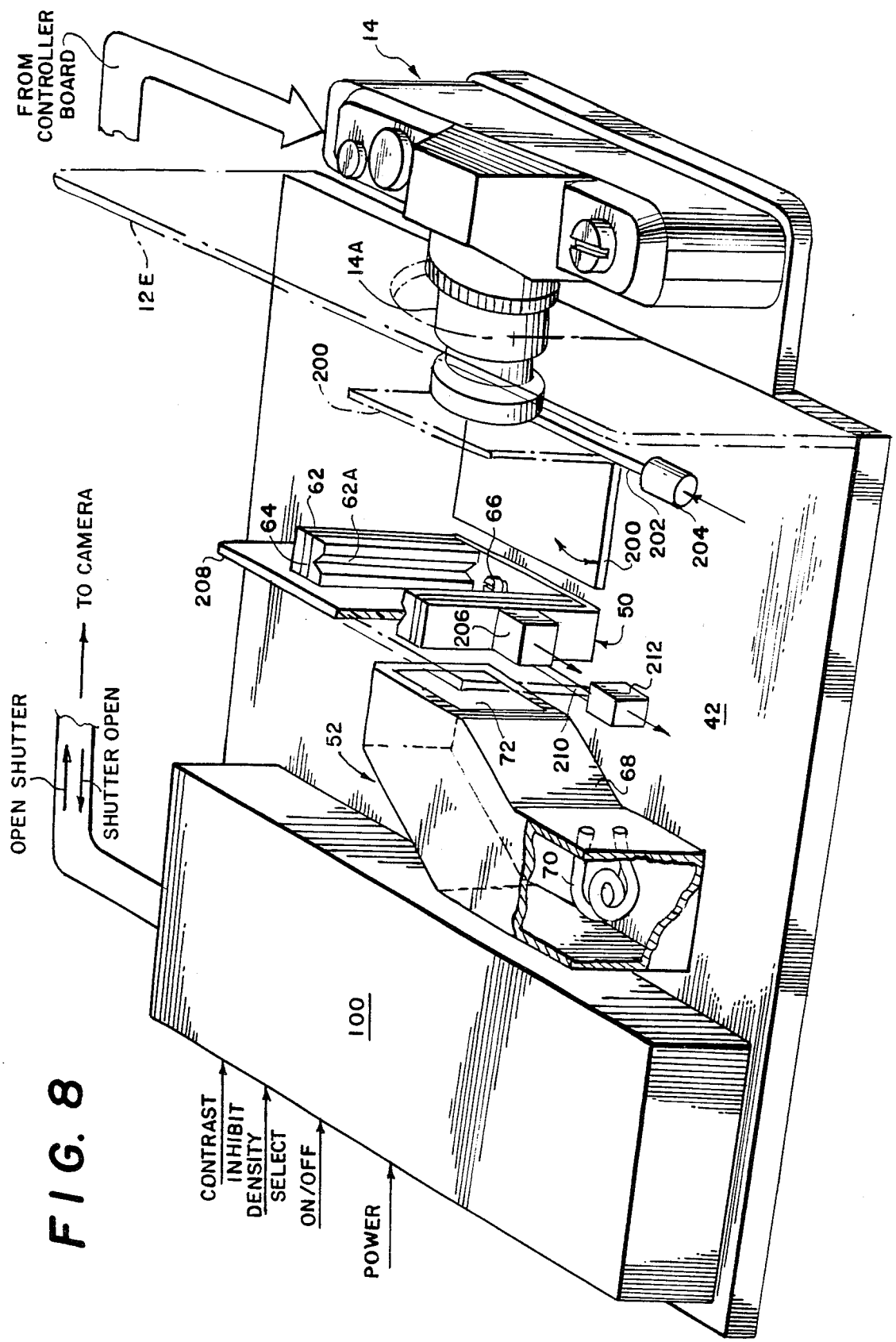

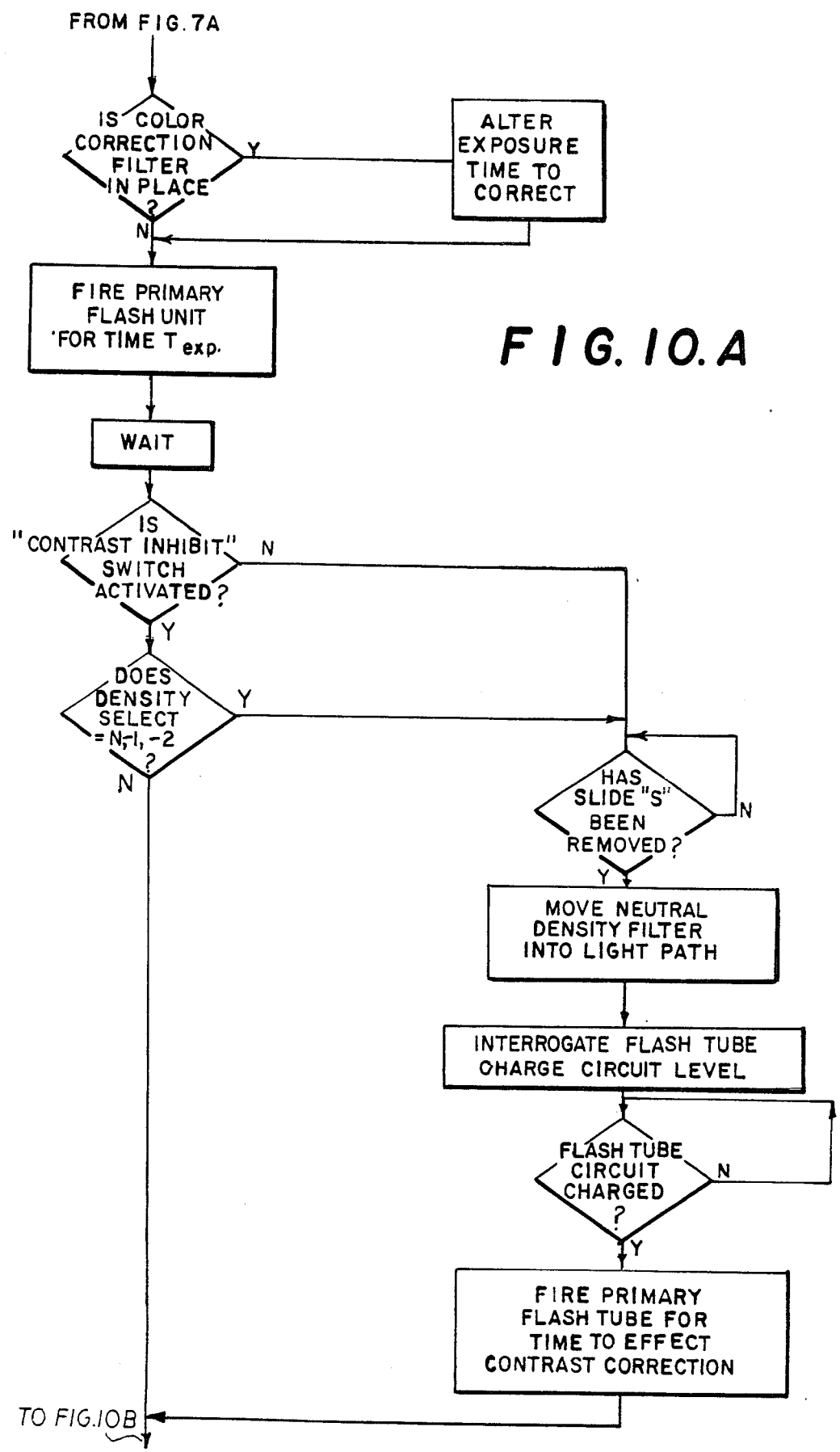
FIG. 10.A

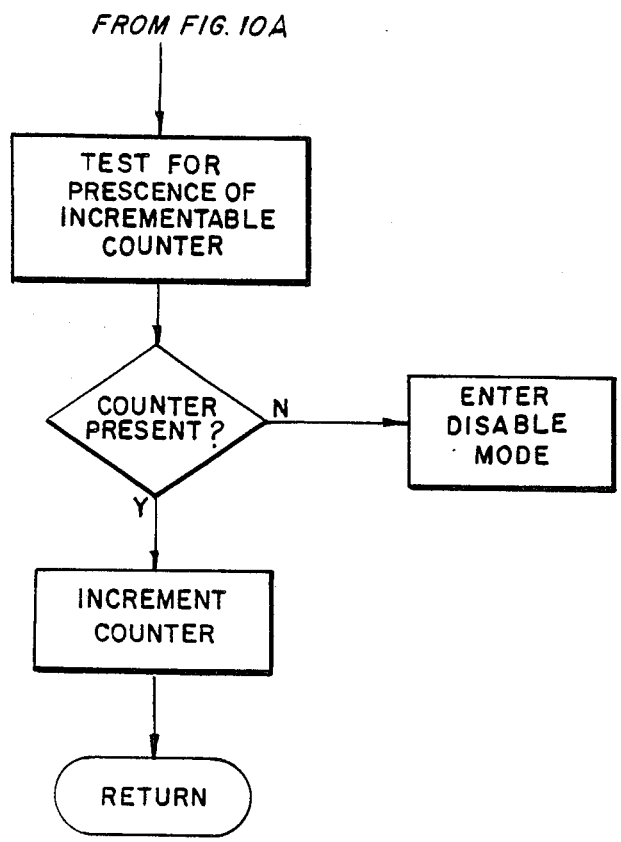
FIG. 10. B
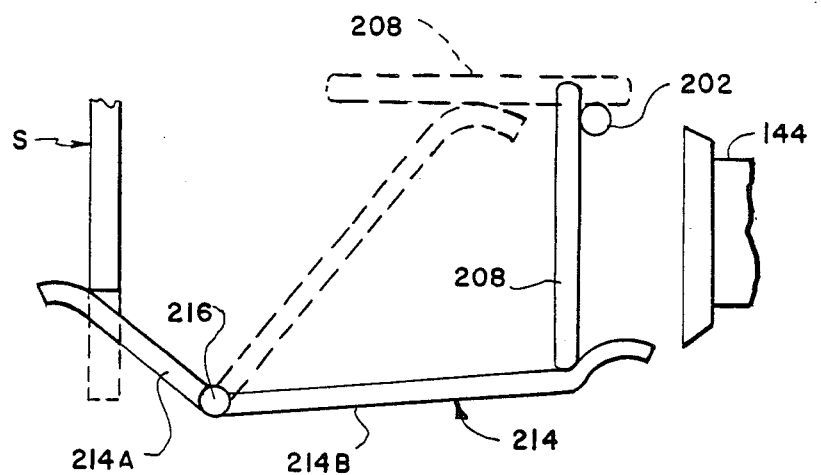
FIG. 9

APPARATUS FOR PRODUCING INTERNEGATIVES AND SLIDES

CROSS REFERENCE TO RELATED APPLICATION

The present application is a continuation-in-part of commonly assigned U.S. patent application Ser. No. 903,478 filed Sept. 4, 1986, issued as U.S. Pat. No. 4,690,546 on Sept. 1, 1987.

BACKGROUND OF THE INVENTION

The present invention relates to the production of internegatives from transparencies and, more particularly, to apparatus for producing internegatives in which the resulting internegative is optimally exposed to the original image and corrected for contrast as part of the exposure process.

In order to produce a photoprint of a transparency, the conventional practice is to illuminate the transparency from the rear and photograph the back-illuminated transparency with a conventional camera. The exposed film is then developed to yield a negative, viz., the internegative, which is then used to produce a photographic print.

While various types of equipment have been developed for the purpose of exposing an internegative as part of the above-described process, a typical arrangement uses an illuminated copy table upon which the slide transparency is placed and through which light from the underlying table passes. A conventional camera, typically equipped with a bellows and lens, is mounted above the copy table so as to allow photographing of the image presented by the back-illuminated slide. A specially designed 'internegative' film, which has a lower contrast than conventional films, is used, and filters must be provided with the light source to correct for undesired spectral components in the illumination. The low-contrast internegative film is required since the process of effecting a photograph of the back-illuminated transparency with normal film increases the contrast of the resulting image; the low-contrast internegative film thus functions to compensate for this effect. When conventional contrast films are used, the increased-contrast effect results in a loss of detail in the resulting image, particularly in the shadow and highlight areas of the image. If conventional film is used, the contrast can be lowered by a second exposure to a minute, but calculated, quantity of diffuse light energy which has the effect of slightly fogging the resulting image and reducing the undesired increment in contrast. In this latter situation, the camera operator must first determine the parameters for the initial exposure of the image, effect the exposure, determine the parameters the contrast-correcting exposure, and then effect the second exposure.

As can be appreciated, the equipment and process steps described above are quite involved and require a fair degree of skill on the part of the operator. In those situations where conventional contrast film is used and contrast correction is effected by another exposure to a source of diffuse light, considerable care must be exercised to avoid overexposure of the image and an unacceptable internegative. In an effort to maximize the probability of an acceptable internegative, many exposures at differing aperture settings and exposure times must be made so that at least one of the resulting internegatives is satisfactory. This practice, of course, is inefficient from the standpoint of time and cost.

SUMMARY OF THE INVENTION

It is a principal object of the present invention, among others, is to provide an apparatus for producing internegatives that is compact in size and more efficient in terms of cost and time than prior devices. It is another object of the present invention to provide an apparatus for producing an internegative which utilizes conventional contrast photographic film to produce the internegative.

It is another object of the present invention to provide an apparatus for producing an internegative in which the exposure of the internegative is dependent upon, in part, the perceived brightness of the transparency from which the internegative is to be made.

It is another object of the present invention to provide an apparatus for producing an internegative in which the exposure of the internegative is effected in such a way that a contrast correction is provided to correct for any increase in the density of the internegative.

It is another object of the present invention to provide an apparatus for producing an internegative in which the required skill level of the operator is minimal so as to increase operating efficiency and lower operating costs.

In accordance with these objects, and others, an apparatus for producing internegatives includes a self-centering slide holder for holding the slide from which the internegative is made, a primary photoflash unit for back-illuminating the slide and projecting the image thereof into a camera, a secondary photoflash unit for directing contrast correction light into the camera via a reflecting plate, and a stored-programmed controlled microprocessor for controlling the time duration of the primary exposure and the contrast correction exposure and the operation of the camera so as to properly expose the negative film in the camera.

In the preferred embodiment, the apparatus for producing internegatives includes a housing having a back-illuminated light screen with exemplary photographic scenes indicating the brightness of an exposure two stops above and below an optimal exposure. The operator visually compares the brightness of the subject of principal interest in the slide to the exemplary scenes and enters the selected value through an 'exposure (density) select' control. The slide is then passed through a slide access slot in the apparatus and positioned in the slide holder which is effective to maintain the slide in a desired position relative to the camera in which the internegative film is loaded. A primary flash unit is mounted so as to back-illuminate the slide with the image thereof passing through the open shutter and into the camera to effect primary exposure of the internegative film. The duration of the primary flash exposure is controlled by a microprocessor as a function of the selected density value. After the primary exposure is effected, a secondary flash unit is operated to direct diffuse, white light into the camera to lower the contrast of the internegative image and to compensate for the undesired contrast-increasing effect of the internegative exposure process. The secondary flash exposure is selectively inhibited depending upon the density value previously selected so as to optimally expose the internegative. The light from the secondary flash is reflected into the camera by a transparent reflecting plate located in the light path of the primary flash unit.

In another embodiment of the present invention, a single flash unit is mounted so as to back illuminate the slide with the image thereof passed through the open shutter to effect the primary exposure of the internegative film. Once the primary exposure is effected, the slide is removed from the apparatus and a neutral density filter is moved into the light path between the flash unit and the camera lens. The flash unit is again operated to direct a shorter-duration flash through the neutral density filter into the camera to provide relatively diffuse white light for contrast correction. In still another form of the invention, a color-correction filter is mounted for movement into and out of the light path to provide color control when making direct slide-to-positive slide film exposures.

The present invention advantageously provides an apparatus for producing internegatives that is compact in size compared to prior arrangements and which can be operated by relatively unskilled operators to produce internegatives or slides in a time and cost efficient manner.

A principal object of the present invention is, therefore, the provision of an improved apparatus for producing internegative in which a properly exposed internegative can be produced by a relatively untrained operator and in a time and cost efficient manner. Other objects and further scope of applicability of the present invention will become apparent from the detailed description to follow, taken in conjunction with the accompanying drawings, in which like parts are designated by like reference characters.

BRIEF DESCRIPTION OF THE DRAWING

FIG. 6 is a functional block diagram of a stored program controlled microprocessor, primary and secondary light mixing units, and a camera component of the internegative apparatus of FIGS. 1 and 4;

FIG. 8 is a partial isometric view of a second embodiment of the present invention in which a single flash unit effects both the primary exposure and the secondary contrast-correcting exposure;

FIG. 9 is a side elevational view of a filter positioning arrangement by which a filter is pivoted into and out of the camera light path; and FIGS. 10A and 10B are a flow diagram illustrating the manner by which the second embodiment of the present invention is operated to effect the primary exposure and the contrast-correcting secondary exposure.

DESCRIPTION OF THE PREFERRED EMBODIMENT

Figure 1:
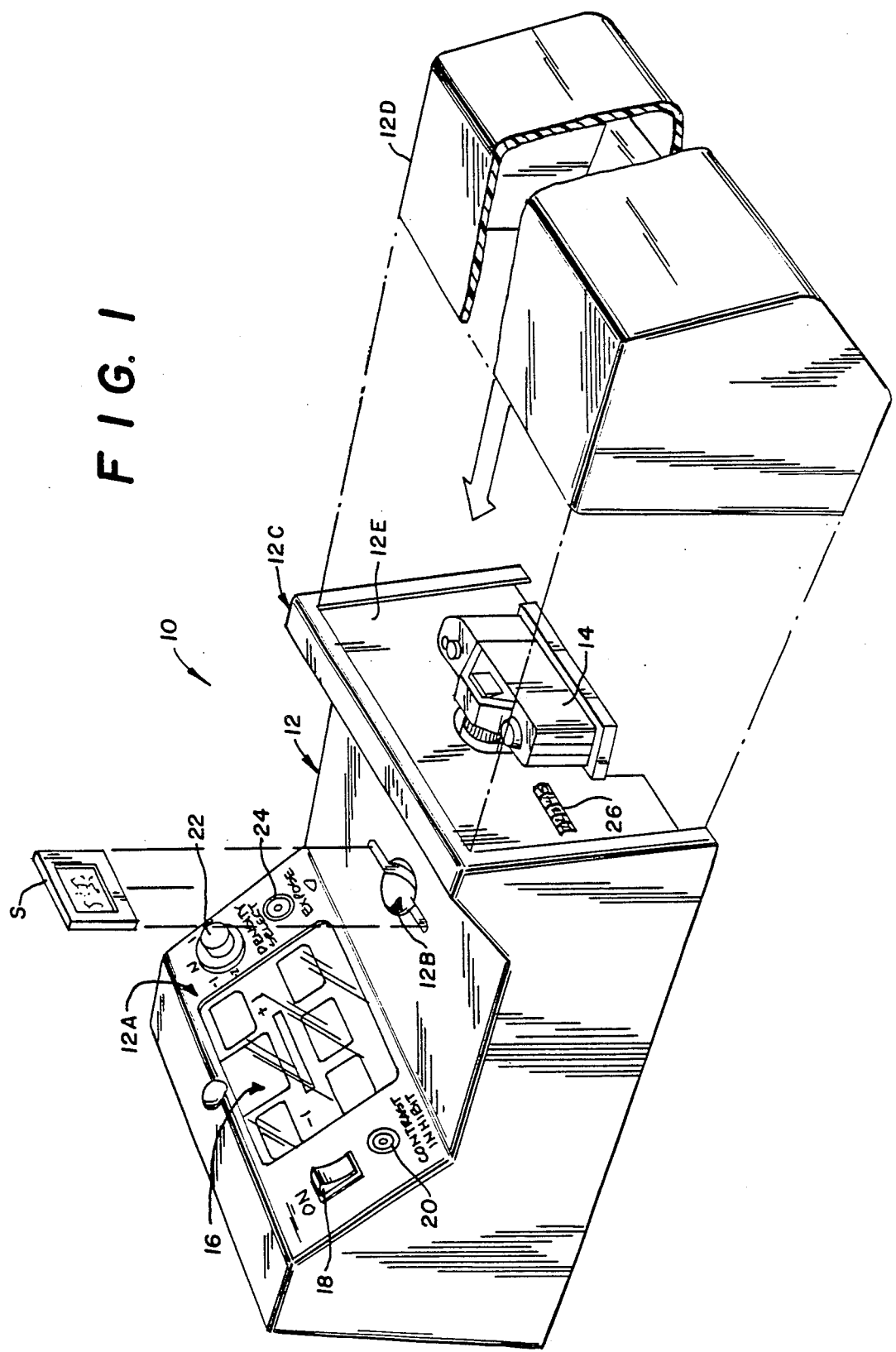
FIG. 1 is a partially exploded isometric view of an internegative apparatus in accordance with the present invention.

A preferred embodiment of an internegative apparatus in accordance with the present invention is shown in FIG. 1 and designated generally therein by the reference character 10. As shown, the internegative apparatus includes a housing 12, preferably formed from a molded plastic, having an upwardly facing surface that includes, at the rear portion of the housing 12, an inclined operator console 12A, a generally horizontally aligned intermediate portion that includes a slide access slot 12B, and a forwardly facing potion 12C that includes a removable cover 12D beneath which an electronically actuated camera 14 is mounted. An exemplary slide "S", which is a 35 mm. transparency mounted in a conventional cardboard or plastic mount, is shown positioned above the slide access slot 12B. A back-illuminated light screen 16 is positioned on the operator console 12A with an ON/OFF power switch 18 and a 'Contrast Inhibit' switch 20 to the left of the light screen 16 and a multi-position 'Density Select' switch 22 and an 'Expose' switch 24 to the right of the light screen 16. An incrementable counter 26 is mounted to the left of the camera 14 on an internal partition 12E to count the total number of operating cycles of the internegative apparatus 10.

Figure 2:
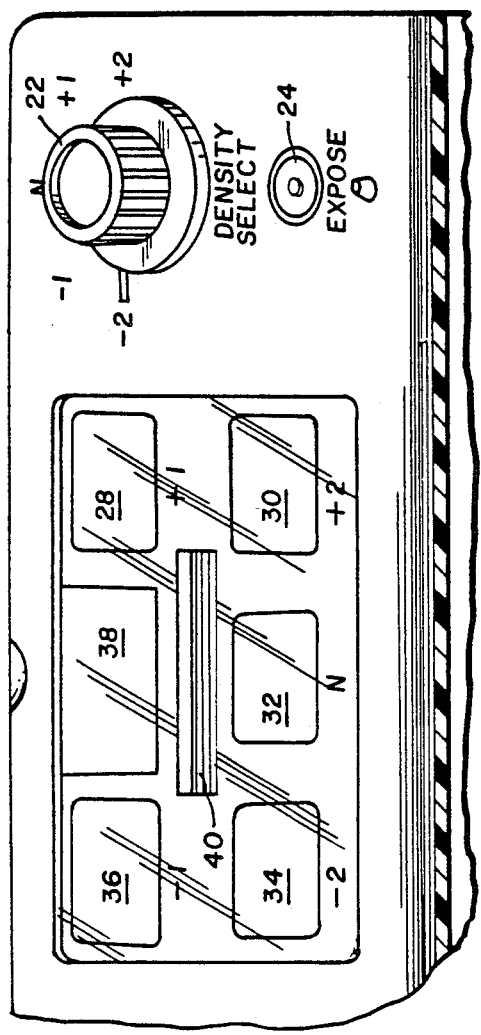
FIG. 2 is a frontal view of an operator console portion of the apparatus shown in FIG. 1 including a light screen for ascertaining the relative brightness of a slide transparency from which the internegative is to be made and related controls and switches.

The light screen 16 is fabricated from a light transmitting material such as glass or plastic and, as shown in FIG. 2, its surface is divided into six zones or areas 28, 30, 32, 34, and 36 which are provided with sample photographic scenes representative of, respectively, scenes that are overexposed by one stop (+1), overexposed by two stops (+2), properly exposed (N), underexposed by two stops (−2), and underexposed by one stop (−1). Lastly, an area 38, without a sample photographic image, is provided between the areas 36 and and 28. A ledge 40 is provided below the area 38 for supporting the slide "S" in general registration therewith to permit the operator to conveniently compare the brightness of the image presented by the slide "S" with the brightness of the sample photographic scenes of the areas 28, 30, 32, 34, and 36. Once the relative brightness of the slide "S", particularly the subject of principal interest, is determined by the operator, the value is entered using the 'Density Select' switch 22, as described more fully below.

Figure 3:
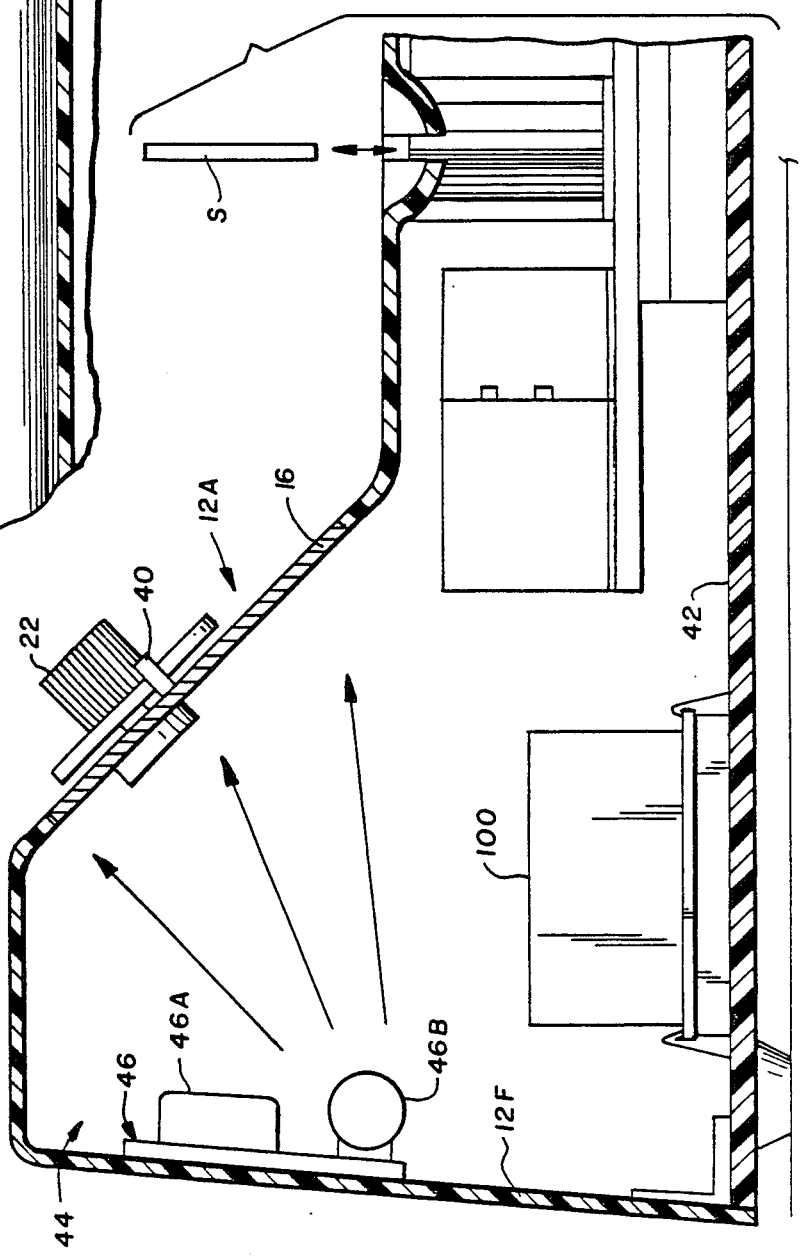
FIG. 3 is a side elevational view, in cross section, of a portion of the internegative apparatus illustrating the manner by which the light screen is back illuminated.

As shown in the cross sectional view of FIG. 3, the housing 12 is mounted upon a base plate 42 to define a light chamber 44 between the inclined operator console 12A and a rear panel 12F of the housing 12. An illumination unit 46 is mounted to the interior of the rear panel 12F and includes a power supply 46A for supplying electric power to a lamp 46B. The light output of the lamp 46B allows proper comparison of the slide "S" and the sample photographic scenes and serves to backlight the light screen 16 to allow a brightness comparison to be made by the operator of the internegative apparatus 10. In the preferred embodiment, the lamp 46B is a fluorescent tube having a length at least coincident with the width of the light screen 16, a Sylvania F6T5/WW lamp being suitable. Electrical power is supplied to the lamp 46B in response to operation of the ON/OFF switch 18 in the usual manner.

Figure 4:
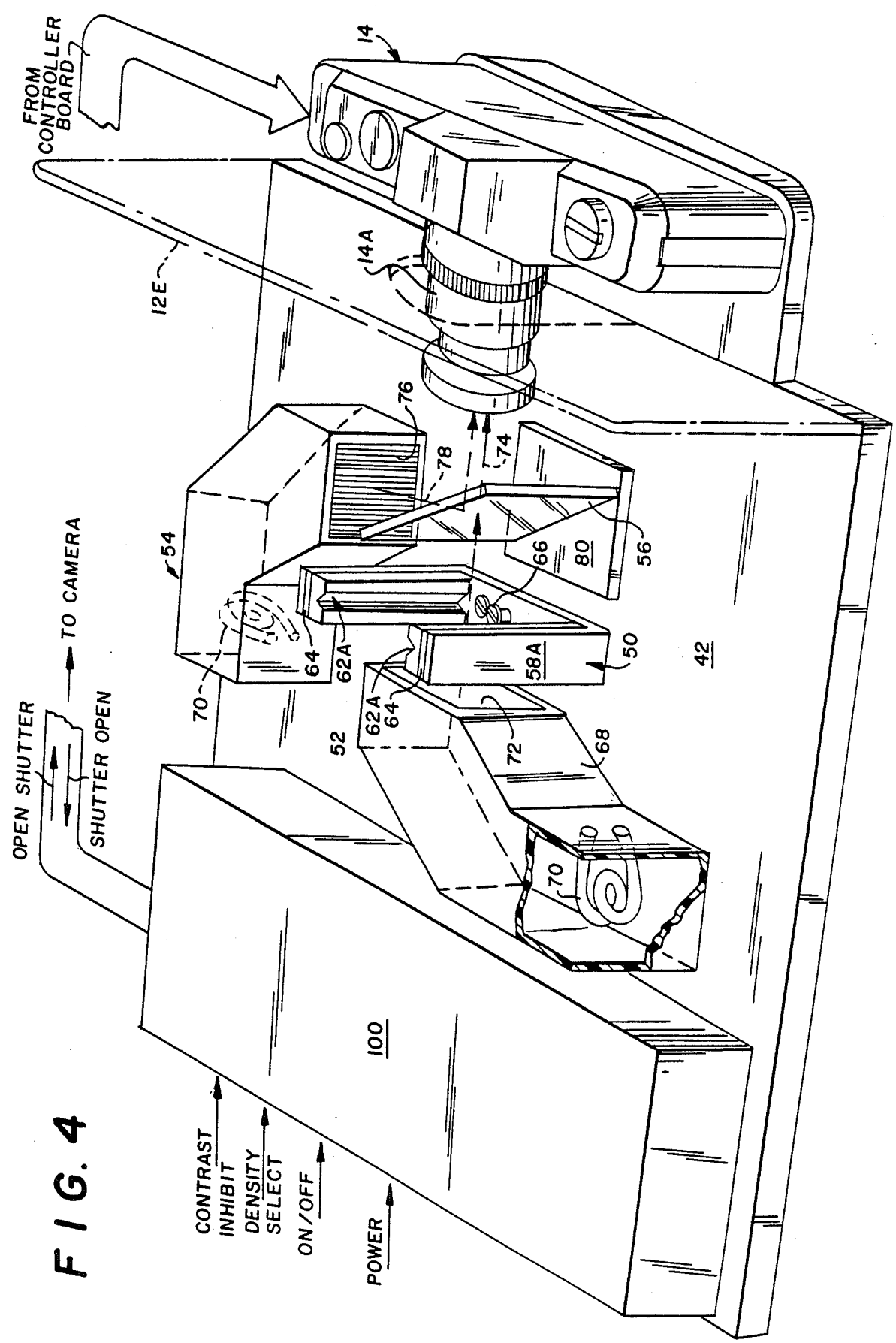
FIG. 4 is an isometric view of the optical components of the internegative apparatus of FIG. 1.

The optical components of the internegative apparatus 10 are mounted upon the base plate 42 and, as shown in FIG. 4, include the camera 14, an auto-centering slide holder 50, a primary light mixing unit 52, a secondary light mixing unit 54, and a reflector plate 56. A controller 100, fabricated as a printed circuit board, is mounted adjacent the primary light mixing unit 52 and effects control of the primary light mixing unit 52, the secondary light mixing unit 54, and the camera 14 as described more fully below.

Figure 5:
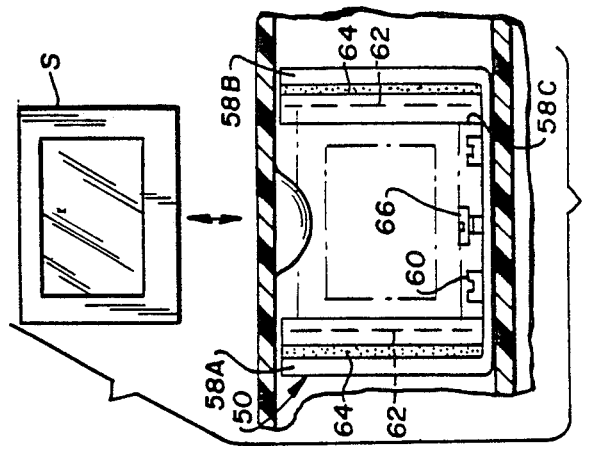
FIG. 5 is a front elevational view of an auto-centering holder of FIG. 4.

The slide holder 50, as shown in FIG. 4 and the detail of FIG. 5, is formed from a U-shaped bracket 58 having spaced apart, upstanding legs 58A and 58B interconnected by an intermediate portion 58C and secured to the base plate 42 by suitable fasteners 60. Guide blocks 62, each having a V-groove 62A formed on one side thereof are mounted to respective legs, 58A and 58B, of the bracket 58 through resilient elastomer pads 64. The guide blocks 62 and their elastomer pads 64 are preferably secured together and to the bracket legs 58A and 58B using a suitable adhesive. An alignment screw 66, in threaded engagement with the base plate 42, is provided to allow adjustment of the position of the slide "S" relative the base plate 42. As can be appreciated from FIGS. 4 and 5, a slide "S" can be inserted through the slide access slot 12B and into the opposed V-grooves 62A of the guide blocks 62 with the resilient pads 64 causing the slide "S" to self-align, regardless of the mount thickness, within the grooves 62A at a vertical position controlled by the alignment screw 66. The resilient pads 64 provide a sufficiently high force to mutually 'grip' and positionally secure the slide "S" against unintended movement during operation of the internegative apparatus 10.

The primary light mixing unit 52 is defined by a housing 68, preferably fabricated from a molded plastic and having the general configuration shown, which forms a closed, hollow chamber. A flash tube 70 is positioned at one end of the housing 68 and a flat, translucent exit panel 72 is positioned at the other end. The flash tube 70 is positioned in the housing 68 so that its light output does not directly irradiate the exit panel 72. The interior surfaces of the housing 68 are preferably a non-reflecting white so that the light output of the flash tube 70 is fully mixed to a uniform intensity distribution at the light exit panel 72. Additionally, the light exit panel 72 is formed from a white, translucent material so that light from the flash tube 70 exiting the primary light mixing unit 52 is uniformly diffused. The light output of the primary light mixing unit 52 serves to back-illuminate a slide "S" mounted in the slide holder 50 with the image thereof projected along the axis 74 and through the reflector plate 56 into and through a lens 14A of the camera 14 to expose the internegative film, as described below. The secondary light mixing unit 54 is structurally similar to primary light mixing unit 52 and includes a flash tube (not specifically illustrated) that provides light to a light exit panel. In contrast to the primary light mixing unit 52, the exit panel of the secondary light mixing unit 54 consists of a translucent diffusing panel (not shown) similar to the panel 72 of the primary light mixing unit 52, and, additionally, a light-absorbing filter 76 that serves to attenuate the intensity of the light exiting the secondary light mixing unit 54. The light exiting the secondary light mixing unit 54 is directed to the reflector plate 56 for reflection through the lens 14A into the camera 14 as represented generally by the axis 78. The reflector plate 56 functions to allow transmission of the image of the back-illuminated slide "S" carried in the slide holder 50 generally along the axis 74 into the camera 14 and reflection of the light output from the secondary light mixing unit 54 generally along the axis 78 into the camera 14. In general, a transparent glass plate, having flat planar surfaces to minimize image degradation, is suitable for the reflector plate 56. While the reflector plate 56 serves the purpose of reflecting light from the secondary light mixing unit 52 into the camera 14, an anti-halation layer (not shown) is preferably applied to the side of the reflector plate 56 facing the slide holder 50. The reflector plate 56 is preferably carried in a slotted mounting block 80 secured to the top surface of the base plate 42 and aligned at an angle of about 45 relative to the axis 74.

The camera 14 is secured to a forward extension of the base plate 42 by suitable fasteners (not specifically shown) with the partition 12E (shown in broken line illustration in FIG. 4) functioning as a light shield separating the camera body from the above described optical components.

The camera 14 is preferably a conventional 35 mm. camera of the type that has an automatic shutter operating cycle that can be initiated by a single control pulse and which then runs to completion under its own internal operating cycle, an autowind feature that advances the film one frame at the completion of the shutter operating cycle, and, lastly, provision for sending a 'shutter open' signal. This latter signal is generally available at a 'sync' output for controlling conventional photoflash units. While a number of cameras having these attributes are suitable, preferred cameras include the Cannon model T50 camera equipped with a flat field 1:1 lens 14A for receiving the image of the back-illuminated slide "S".

The controller board 100 includes a power supply for providing power to the various components of the system, photoflash drive circuits that accumulate an electrical charge for exciting the photoflash tubes 70, control circuitry responsive to a trigger signal to discharge a photoflash tube for a selected duration, and a stored-program controlled processor for effecting overall control in the manner described below.

As shown in FIG. 6, the controller board 100 architecture includes a stored-program controlled processor 102, preferably of the 1-chip type, a first controllable flash tube drive circuit 104 for driving the primary light mixing unit 52, and a second controllable flash tube drive circuit 106 for driving the secondary light mixing unit 54. The camera 14 is connected to the processor 102 through an 'open shutter' and a 'shutter open' control line, and the incrementable counter 26 is connected through a 'count 1' signal line. Additionally, the 'Density Select' switch 22, which is 5-position rotary switch in the preferred embodiment, the 'Expose' switch 24, and the 'Contrast Inhibit' switch 20 are likewise connected to the processor 102.

The processor 102 includes an arithmetic logic unit, one or more registers for manipulating data, a read-only-memory (ROM) for storing an instruction set, a random-access memory (RAM) for temporary storage of operating parameters and the like, and input/output ports I/O for accepting various input control signals and information and outputting control signals to the various controlled devices. In the preferred embodiment, the stored program controlled processor 102 is selected from the MC68705 family of 8-bit EPROM microcomputers manufactured by Motorola Semiconductor Products, Inc. of Austin, Tex. 78721 and is preferably a MC68705R3microcomputer which includes a CPU, on-chip clock, an EPROM for the programmed instruction set described below in relationship to FIGS. 7A and 7B, ROM, RAM, and an analog-to-digital converter for sensing analog voltages. The flash tube drive circuits 104 and 106 are of conventional design in that a power supply provides a charge voltage (e.g., 350 VDC) to a capacitive storage device which accumulates a charge sufficient to excite the flash tubes 70 for the desired duration. A trigger signal provided through a pulse transformer causes the flash tube 70 to go into conduction and discharge the capacitive storage device. Additionally, circuitry and related devices, such as fast turn-on SCR's, are provided to quench the flash to control total flash duration and, accordingly, the total light energy passed into the camera 14. As shown in FIG. 6, each flash tube drive circuit, 104 and 106, is connected to the processor 102 by a 'charge level' signal line, a 'trigger flash' line for firing the respective flash tube 70, and a 'flash quench' line for turning the flash tube 70 off.

In order to produce an internegative from a slide "S", the operator places the slide "S" upon the slide support ledge 40 of the light screen 16. With the lamp 46A (FIG. 3) illuminating the rear of the light screen 16 and back-illuminating the slide "S", the operator compares the brightness of the slide "S", including the subject of principal interest, with the exemplary scenes provided in zones 28, 30, 32, 34, and 36 to determine which of the exemplary scenes matches the brightness of the slide "S" most closely and thus determine whether the slide "S" is properly exposed, underexposed by one or two stops, or overexposed by one or two stops. Once the determination has been made, the 'Density Select' switch 22 is rotated to the proper position, viz., 'N' for normal exposure, '+1' or '+2' for overexposed slides, or '−1' or '−2' for underexposed slides. The 'Density Select' switch 22 is preferably of the rotary switch type and provides one-of-five possible digital line conditions to the processor 102 to indicate the exposure level. As can be appreciated, other user-operated switches or interfaces can be used to input the selected contrast information. Thereafter, the slide "S" is removed from the ledge 40 and inserted through the slide access slot 12B into the slide holder 50 (FIG. 4) where the slide "S" is centered at the proper position above the base plate 42. Thereafter, the operator depresses the 'Expose' switch 24 to initiate the exposure sequence of FIGS. 7A and 7B. If desired and as explained below, the operator can also depress the 'Contrast Inhibit' switch 20 to inhibit contrast correction of the resulting internegative.

Figure 7A:
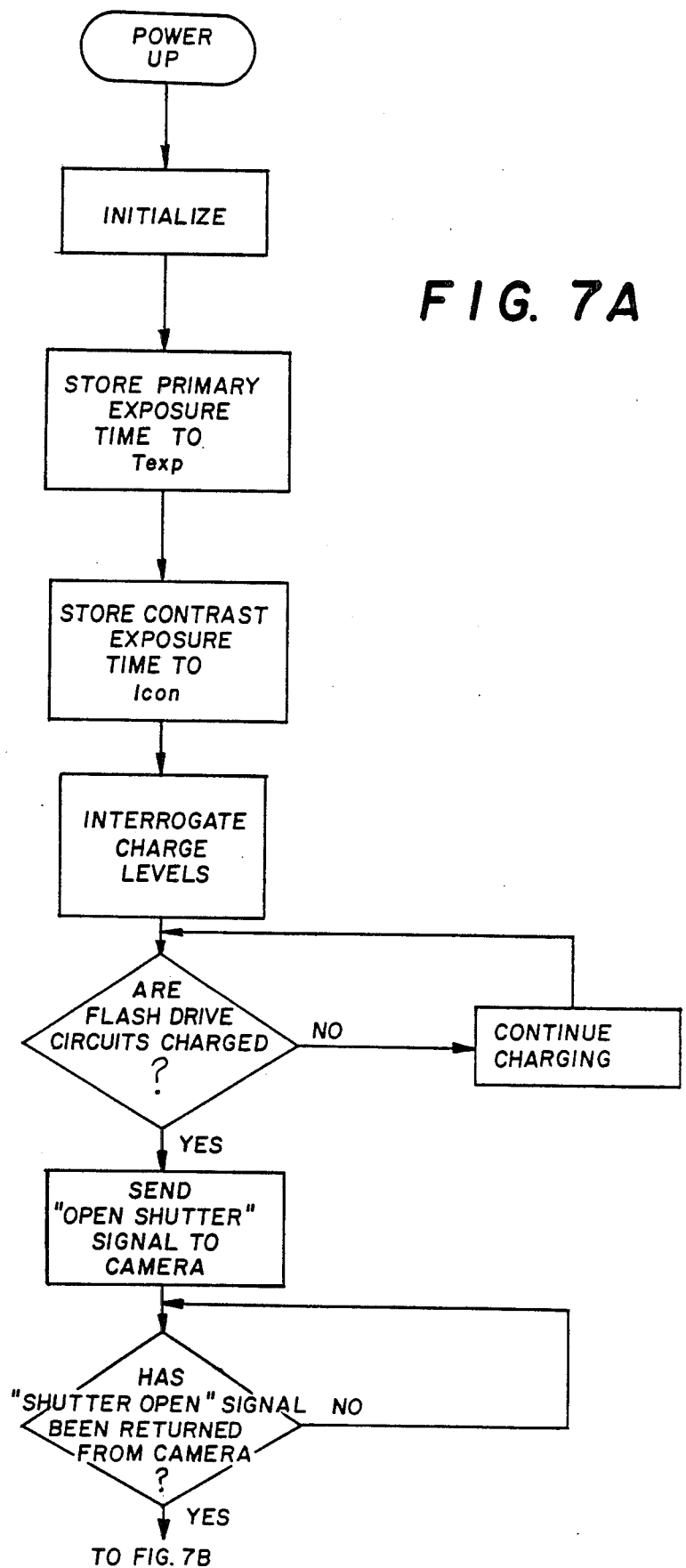
FIG. 7A and FIG. 7B are flow diagrams illustrating the manner by which the stored program controlled processor of FIG. 6 controls the primary and secondary light mixing units and the camera component of the internegative apparatus.
Figure 7B:
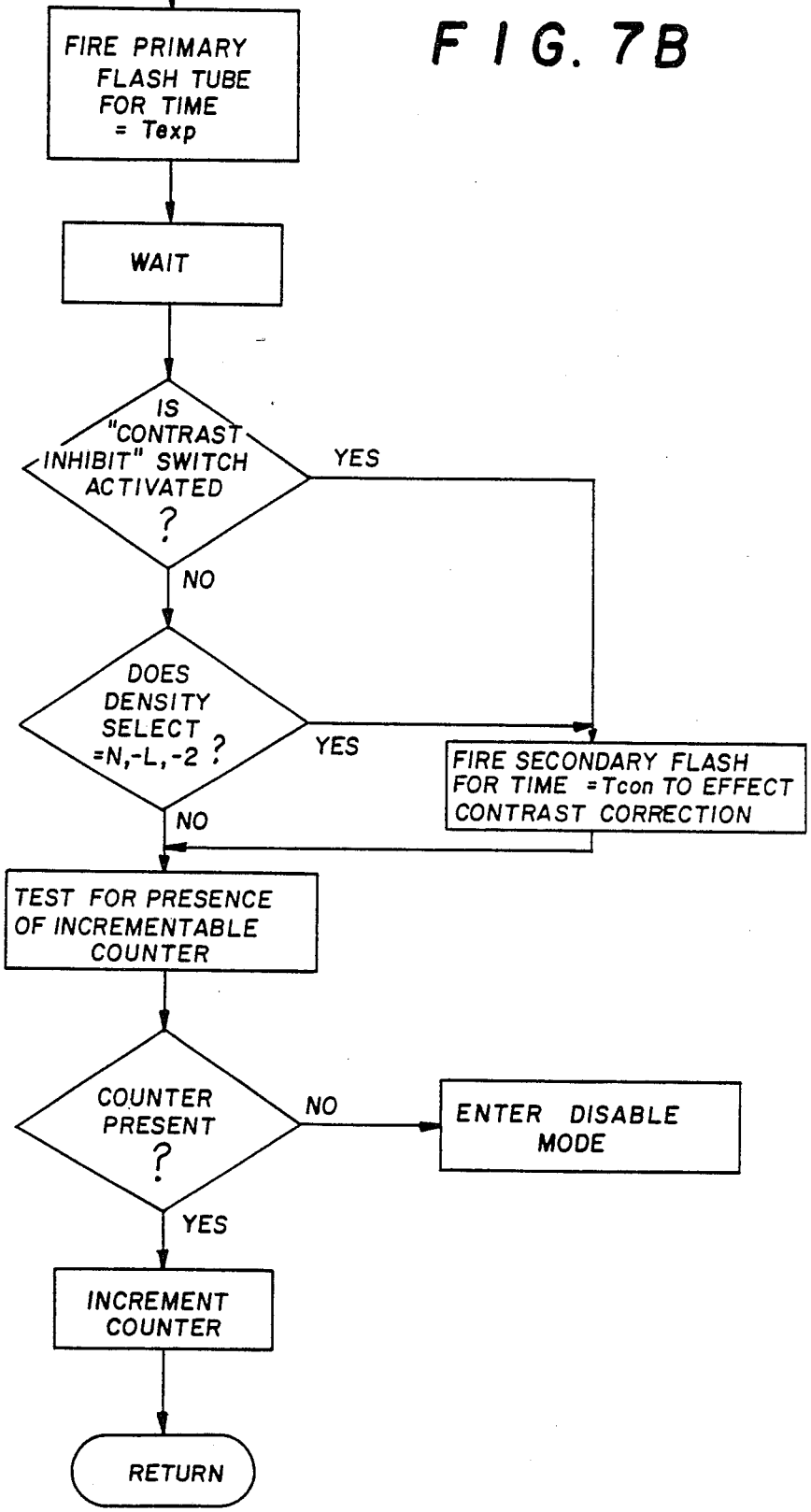

As shown in FIGS. 7A and 7B, the processor 102, after power-up and initialization, interrogates the 'Density Select' switch 22 and stores the value (that is, the value representative of a +2, +1, N, −1, or −2 relative brightness) to a memory location. A time duration value for the primary exposure $T_{exp}$ is then stored to a memory location, and a time duration value for the secondary contrast correcting exposure Tcon is likewise stored to a memory location. The secondary contrast correcting exposure duration $T_{con}$ is typically fixed at 0.067 milliseconds (ms) while the primary exposure duration $T_{exp}$ varies as function of the position of the 'Density Select' switch 22 as presented in the table below. The values presented have been empirically determined as appropriate for conventional ISO 100 negative film.

TABLE

| DENSITY SELECT | EXPOSURE DURATION Texp |
| --- | --- |
| +2 | 4.0 ms |
| +1 | 1.0 ms |
| N | 0.25 ms |
| −1 | 0.125 ms |
| −2 | 0.067 ms |

The 'charge level' signal lines of the primary and secondary flash tube drive circuits 104 and 106 are then interrogated to determine if the charge level for these circuits is at the desired level. If the charge state is below the desired level, the control sequence loops until the desired charge level is attained. The 'Expose' switch 24 is then interrogated until an ON state is detected. The processor 102 then issues a 'OPEN SHUTTER' command to the camera 14 and then waits for the 'SHUTTER OPEN' verification command to be returned from the camera 14. In general, the camera 14 is pre-set for an automatic exposure cycle of 1/60 second with an F/8 aperture, this exposure duration sufficient to allow operation of the primary and secondary photoflash units 52 and 54. Once the 'SHUTTER OPEN' signal from the camera 14 is sensed, the processor 102 triggers the primary light mixing unit 52 for a time duration equal to the stored value of $T_{exp}$, which is functionally dependent upon the selected density value as described above.

The light exiting the exit panel 72 of the primary light mixing unit 52 passes through the slide "S" mounted in the slide holder 50, the reflector plate 56, the lens 14A, and the opened shutter into the camera 14 where the negative film is exposed. Since the reflector plate 56 is preferably fabricated from coated transparent glass, as described above, image degradation is minimal. At the conclusion of the primary exposure and a short wait cycle, the 'Contrast Inhibit' switch 20 is interrogated and, if the switch 20 has not been actuated by the operator, the secondary flash drive circuit 106 is triggered by the processor 102 for the $T_{con}$ exposure duration, typically 0.067 ms, to compensate for the contrast increasing effect that occurs during the exposure of the internegative. Where the 'Contrast Inhibit' switch 20 has been actuated, the contrast select status is determined and, where the contrast select status is +2 or +1, the secondary flash is skipped, and, where the contrast select status is N, −1, or −2, the secondary exposure is performed as described above. For most photographic scenes the 'Contrast Inhibit' switch 20 is not actuated, but where a higher contrast internegative is desired, for example, when copying advertising materials, display charts, and the like, the contrast correction is normally not desired and the 'Contrast Inhibit' switch 20 is actuated. At the conclusion of the primary and secondary exposures, or the primary exposure only under the conditions described, the processor 102 tests for the presence of the incrementable counter 26, for example, by measuring for the presence of a voltage level, and, if the counter 26 is determined to be in circuit, a 'COUNT 1' signal is sent to increment the counter 26. Where the processor 102 can not confirm the presence of the counter 26, for example, where the internegative apparatus 10 has been tampered with by removal of the counter 26, the processor 102 enters a disable mode to prevent further operation. In the usual situation where the counter 26 is incremented, the processor 102 then returns to the beginning of the sequence for the next operating cycle.

A second embodiment of the present invention is shown in FIG. 8 and designed generally therein by the reference character 10'. As shown, the secondary light mixing unit 54 and the reflector plate 56 have been removed with the primary light mixing unit 52 controlled to provide both the primary and contrast-correcting exposures in cooperation with a movably mounted neutral density filter. In addition, a movably mounted color correction filter is provided for use when making a direct slide-to-positive film exposure. As shown in FIG. 8, a neutral density filter 200, similar in optical characteristics to the filter 76 described above, is secured to a shaft 202 for pivotal movement under the control of a rotary drive unit 204, such as a rotary solenoid, for movement between a lowered, inoperative position (solid line illustration) and a raised, operative position (broken-line illustration) in which the neutral density filter 200 is interposed in the light path between the light mixing unit 52 and the camera 14. As explained below in relationship to FIG. 9, other devices by be used to raise and lower the neutral density filter 200.

A switch unit 206, such as a micro-switch, is connected to the slide holder 50 and is effective to determine the presence or absence of a slide "S" in the slide holder 50 and provide an appropriate signal.

A color correction filter 208 is mounted in a guideway 210 for sliding movement between a first, inoperative position (solid line illustration) and a second, operative position with the color correction filter 208 interposed in the light path between the light mixing unit 52 and the camera 14. A switch unit 212 is positioned at the end of the guideway 210 and functions to detect the presence or absence of the color correction filter 208 in the light path and provide an appropriate signal. As can be appreciated, other arrangements can be used to introduce and remove the color correction filter 208 from the light path including the provision of a filter access slot and filter holder in a manner structurally analogous to the slide access slot 12B and the slide holder 50.

The schematic block diagram (not shown) for the embodiment of FIG. 8 is similar to that of FIG. 6 for the first embodiment but does not include interfacing for a second light mixing unit and includes interfacing for accepting switch signal outputs of the switch units 206 and 208 and providing a command signal to the rotary drive unit 204 to control the movement of the neutral density filter 200.

The embodiment of FIG. 8 operates in accordance with the flow diagrams of FIG. 7A, as described above, and FIGS. 10A and 10B. After the operations sequences of FIG. 7A are effected in the manner described above and as shown in FIG. 10A, the switch 212 is interrogated to determine the presence or absence of the color correction filter 208, and, where the color correction filter 208 is present the value of $T_{exp}$ is adjusted a appropriate. The flash tube 70 of the light mixing unit 52 is then fired for an exposure duration $=T_{exp}$ to effect the primary exposure. After a short delay period, the 'contrast inhibit' switch 20 is interrogated and, if the response is no, the program control branches to effect contrast correction, and, if the response is yes, the program control proceeds to query the 'density select' switch 22. Where the density select value is N, −1, or −2, program control again branches to effect contrast correction, and, where the density select value is not N, −1, or −2, program control continues without effecting contrast correction.

When contrast correction is indicated, the switch unit 206 is interrogated to determine if the slide "S" is still present in the slide holder 50 or has been removed. When the slide "S" is removed from the slide holder 50, as indicated by the output of the switch unit 206, the rotary drive unit 204 is commanded by the microprocessor 102 (FIG. 6) to move the neutral density filter 200 to its raised position, as indicated in dotted line, in the light path between the light mixing unit 52 and the camera 14. Thereafter the charge level of the light mixing unit 52 is tested until the desired level is obtained and the flash tube 70 of the light mixing unit is fired for time period $T_{con}$ to effect the desired contrast correction. Thereafter the counter is incremented in the manner described above for the first embodiment with program control return to re-initialize.

In the embodiment of FIG. 8, a rotary drive unit 204 has been presented for controlling the motion of the neutral density filter 200. As can be appreciated, other arrangements are suitable. For example and as shown in FIG. 9, the neutral density filter 200 and its shaft 202 can be mounted above the lens 14A of the camera 14 for pivotal movement between a lower, operative position (solid line illustration) in the light path and a upper, inoperative position (dotted line illustration) above of the light path. A mechanical connection can be effected between the slide "S" and the neutral density filter 200 by a lever 214 that include a first moment arm 214A engaged by the slide "S" and a second, longer moment arm 214B which engages and moves the neutral density filter 200. The moment arms 214A and 214B are connected at a fulcrum shaft 216 mounted for pivotal rotation on the base plate 42 (not shown) in FIG. 9. As the slide "S" is pushed down into the slide holder 50, the bottom edge of the slide "S" engages the shorter moment arm 214A to pivot the moment arm 214B counterclockwise about the shaft 216 and raise the neutral density filter 200 to its upper, inoperative position, as shown in dotted line illustration.

As can be appreciated from the above, the present invention provides an apparatus for producing internegatives which is relatively compact and yet allows a relatively unskilled operator to consistently produce properly exposed internegatives in a cost and time efficient manner.

Thus it will be appreciated from the above that as a result of the present invention, a highly effective apparatus for producing internegatives is provided by which the principal objective, among others, is completely fulfilled. It will be equally apparent and is contemplated that modification and/or changes maybe made in the illustrated embodiment without departure from the invention. Accordingly, it is expressly intended that the foregoing description and accompanying drawings are illustrative of preferred embodiments only, not limiting, and that the true spirit and scope of the present invention will be determined by reference to the appended claims and their legal equivalent.

What is claimed is:

1. An apparatus for producing an exposed film image of a transparency, comprising:
   means for positioning a transparency from which an exposed film image is to be made;
   means for determining the presence or absence of a transparency positioned by said first-mentioned means and for providing a signal at least indicative of the absence of a transparency;

camera means having a selectively controllable shutter for exposing film therein with an image of a transparency position by said first-mentioned means;

illumination means selectively controlled to project light onto the transparency for a selected time duration to expose film in said camera means with an image of the transparency; and control means coupled to said camera means and said illumination means for selectively opening said shutter and controlling said illumination means to project light onto the transparency for a selected time duration to expose film in said camera means with an image of the transparency and responsive to a signal from said second-mentioned means indicative of the absence of a transparency to control said illumination means to project light for another selected time duration into said camera means to further expose the film in said camera means.

2. The apparatus of claim 1, further comprising:
filter means movably mounted for movement between an operative position to filter light entering said camera means and an inoperative position and coupled to said second-mentioned means for movement to said inoperative position in response to a transparency positioned by said first-mentioned means.

3. The apparatus of claim 2, wherein said filter means comprises a neutral density filter.

4. The apparatus of claim 2, wherein said filter means comprises an electrical actuator for effecting movement thereof between the operative and inoperative positions.

5. The apparatus of claim 2, wherein said filter means comprises a mechanical linkage responsive to the presence or absence of the transparency for effecting movement thereof between the inoperative and operative positions.

6. The apparatus of claim 1, further comprising:
color correction filter means movably mounted between a first position to filter light entering said camera means and a second inoperative position.

7. The apparatus of claim 6, further comprising:
means for determining the position of said color correction filter means and providing a signal indicative of said color correction filter in its first position.

8. The apparatus of claim 7, wherein said control means responds to said signal indicative of said color correction filter in its first position to change the control of said illumination means to the light projected onto transparency to vary the exposure of the film in said camera means.

9. The apparatus of claim 1, further comprising:
user operable switch means for inhibiting operation of said illumination means to effect the other of the selected time duration exposures.

10. The apparatus of claim 1, wherein said illumination means comprises a selectively triggerable photoflash tube.

11. The apparatus of claim 10, wherein said illumination means further comprises a light exit panel through which light from said photoflash tube passes.

12. The apparatus of claim 11, wherein said illumination means further comprises a housing for mounting said photo tube and said light exit panel, said housing configured so light from said photoflash tube does not directly irradiate said light exit panel.

13. The apparatus of claim 11, wherein said light exit panel is fabricated rom a translucent, light diffusing material.

14. The apparatus of claim 11, wherein said first-mentioned means comprises a bracket having spaced guides each with a groove for supporting a side edge of a transparency.

15. The apparatus of claim 11, wherein said first-mentioned means comprises a bracket having spaced apart, resiliently mounted guide means each with a groove for supporting a side edge of a transparency.

16. An apparatus for producing an exposed film image of a transparency, comprising:
means for determining the relative brightness of a transparency from which film is to be exposed;

means for providing a signal representative of the relative brightness of the transparency;

means for positioning a transparency from which an exposed film image is to be made;

means for determining the presence or absence of a transparency positioned by said positioning means and for providing a signal at least indicative of the absence of a transparency;

camera means having a selectively controllable shutter for exposing film therein with an image of a transparency positioned by said third-mentioned means;

illumination means selectively controllable to project light onto the transparency for a selected time duration to expose film in said camera means with an image of the transparency;

control means coupled to said camera means and said illumination means and said fourth-mentioned means for selectively opening said shutter and controlling said illumination means to project light onto the transparency for a selected time duration to expose film in said camera means with an image of the transparency and responsive to the relative brightness signal to at least partially control the selected time duration as a function of the relative brightness signal.

17. The apparatus of claim 16, wherein said control means is responsive to a signal from said positioning means indicative of the absence of a transparency to control said illumination means to project light for another selected time duration into said camera to further expose the film in said camera means.

18. The apparatus of claim 17, further comprising:
filter means movably mounted for movement between an operative position to filter light entering said camera means and an inoperative position and coupled to said fourth-mentioned means for movement to said inoperative position in response to a transparency positioned by said third-mentioned means.

19. The apparatus of claim 18 wherein said filter means comprises a neutral density filter.

20. The apparatus of claim 18, wherein said filter means comprises an electrical actuator for effecting movement thereof between the operative and inoperative positions.

21. The apparatus of claim 18, wherein said filter means comprises a mechanical linkage responsive to the presence or absence of the transparency for effecting movement thereof between the inoperative and operative positions.

22. The apparatus of claim 16, further comprising:
color correction filter means movably mounted between a first position to filter light entering said camera means and a second inoperative position.

23. The apparatus of claim 22, further comprising:
means for determining the position of said color correction filter means and providing a signal indicative of said color correction filter in its first position.

24. The apparatus of claim 23, wherein said control means responds to said signal indicative of said color correction filter in its first position to change the control of said illumination means to vary the light projected onto transparency to vary the exposure of the film in said camera means.

25. The apparatus of claim 17, further comprising:
user operable switch means for inhibiting operation of said illumination means to effect the other of the selected time duration exposures.

26. The apparatus of claim 16, wherein said illumination means comprises selectively triggerable photoflash tube.

27. The apparatus of claim 16, wherein said illumination means further comprises a light exit panel through which light from said photoflash tube passes.

28. The apparatus of claim 16, wherein said third-mentioned means comprises a bracket having spaced guides each with a groove for supporting a side edge of a transparency.

29. The apparatus of claim 16, wherein said third-mentioned means comprises a bracket having spaced apart, resiliently mounted guide means each with a groove for supporting a side edge of a transparency.

* * * * *